(12) United States Patent
Oroskar et al.

(10) Patent No.: US 10,117,133 B1
(45) Date of Patent: Oct. 30, 2018

(54) SCHEDULING DATA PACKETS PRIOR TO HANDOVER EXECUTION

(71) Applicant: Sprint Spectrum LP, Overland Park, KS (US)

(72) Inventors: Siddharth Oroskar, Overland Park, KS (US); Jasinder Singh, Olathe, KS (US); Rajil Malhotra, Olathe, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 225 days.

(21) Appl. No.: 15/017,843

(22) Filed: Feb. 8, 2016

(51) Int. Cl.
*H04W 36/00* (2009.01)
*H04B 7/155* (2006.01)

(52) U.S. Cl.
CPC .... *H04W 36/0016* (2013.01); *H04B 7/15507* (2013.01); *H04W 36/0088* (2013.01)

(58) Field of Classification Search
CPC .......... H04W 36/0016; H04W 36/0088; H04B 7/15507
See application file for complete search history.

(56) References Cited

U.S. PATENT DOCUMENTS

| | | | |
|---|---|---|---|
| 8,885,600 B2 | 11/2014 | Lee et al. | |
| 2008/0188223 A1* | 8/2008 | Vesterinen | H04W 36/02 455/436 |
| 2010/0323705 A1* | 12/2010 | Iwamura | H04W 88/16 455/440 |
| 2011/0261747 A1* | 10/2011 | Wang | H04B 7/155 370/315 |
| 2012/0315916 A1* | 12/2012 | Van Phan | H04W 36/08 455/442 |
| 2014/0241219 A1* | 8/2014 | Patil | H04W 72/02 370/280 |

* cited by examiner

*Primary Examiner* — Ajay Cattungal

(57) ABSTRACT

A relay node is enabled to transmit, to an end-user wireless device, any data packets remaining in a buffer associated with the end-user wireless device, prior to executing a handover of the end-user wireless device. Upon initiating a handover, the relay node adjusts a scheduling operation to use a lowest-possible modulating coding scheme (MCS) in order to transmit the remaining buffered data to the end-user wireless device. Moreover, the scheduling operation is adjusted to ignore any subsequent channel quality indicator (CQI) reports from the end-user wireless device, thereby ensuring that the end-user wireless device has a higher chance of receiving the data. When the buffer is empty, the handover is executed.

18 Claims, 6 Drawing Sheets

SCHEDULING DATA PACKETS PRIOR TO HANDOVER EXECUTION

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to deploy small access nodes, such as mini-macro access nodes (or "mini-macros") that function as a relay node for relaying communication from a macro base station or eNodeB, that functions as a donor access node, to an end-user wireless device. Relay nodes may be used at the edge of a coverage area of a donor access node to improve coverage and/or service, as well as in crowded areas having a high number of other wireless devices to increase the available throughput to the end-user wireless devices being relayed. However, handovers from relay nodes to other access nodes may consume additional network resources. For example, upon initiation of a handover, session data that is stored on a buffer of a relay node and intended to be transmitted to the end-user wireless device has to be transmitted, via the core network, to the destination access node, so that the user experiences a seamless handover. Moreover, if the destination access node is another relay node, additional processes are required, such as tunneling and signaling. Thus, it takes extra resources to handover an end-user wireless device from a first relay node to a second relay node.

OVERVIEW

Exemplary embodiments described herein include systems, methods, and nodes for scheduling data packets to an end-user wireless device prior to execution of the handover of the wireless device to another relay node. A method for scheduling data packets prior to handover execution includes initiating a handover of a wireless device from a first access node to a second access node. Prior to executing the handover, the method transmits any existing data in a downlink buffer associated with the wireless device to the wireless device and, upon determining that the downlink buffer is substantially empty, executes the handover.

A system for scheduling data packets prior to handover execution includes a first access node for providing network services to a wireless device, and a processor communicatively coupled to the first access node. The processor configures the access node to execute operations including receiving a signal measurement of a second access node from the wireless device, determining that a handover of the wireless device is required from the first access node to the second access node and, prior to executing the handover, transmitting to the wireless device a substantial portion of data packets in a buffer associated with the wireless device.

A processing node for scheduling data packets prior to handover execution includes receiving an identity of an access node from a wireless device, determining that a handover of the wireless device is required to the access node, and transmitting a handover request to the access node. Upon determining that the identity of the access node meets a criteria, the processing node transmits to the wireless device any existing data from a buffer associated with the wireless device until the buffer is substantially empty and, upon determining that the buffer is substantially empty, executes the handover of the wireless device to the access node.

DETAILED DESCRIPTION

In embodiments disclosed herein, a relay node is enabled to transmit, to an end-user wireless device, any data packets remaining in a buffer associated with the end-user wireless device, prior to executing a handover of the end-user wireless device. Thus, the remaining data packets in the buffer need not be transmitted across the network to a destination access node, thereby mitigating any risk of disrupting the communication to the end-user wireless device caused by the excess time to transmit the data packets to the destination access node, and thereby diminishing the user experience. Upon determining that a handover is necessary, or needs to be initiated, the relay node requests or otherwise receives a signal measurement of the destination access node, and determines an identifier of the destination access node. If the relay access node determines that the destination access node is another relay access node, or an access node to which it would take excess time to transmit remaining buffered data intended for the end-user wireless device, then the relay access node determines instead to transmit the remaining buffered data directly to the end-user wireless device prior to executing the handover. The relay node can initiate the handover and transmit a handover request to the destination access node prior to emptying the buffered data.

Moreover, a scheduling operation at the relay node is adjusted so as to use a lowest-possible modulating coding scheme (MCS) in order to transmit the remaining buffered data to the end-user wireless device. The scheduling operation is further adjusted to ignore any subsequent channel quality indicator (CQI) reports from the end-user wireless device, since CQI reports typically alter the MCS that is used to schedule the data. Ignoring the CQI reports and using the lowest-possible MCS ensures that the end-user wireless device has a higher chance of receiving the data, versus using a higher MCS that can be subject to losses. When the relay access node determines that the buffer is empty, or nearly empty, the handover is executed by, for instance, issuing a handover command to the end-user wireless device. The handover may be an X2 handover. There may be a handover timeout period starting from the handover request to the destination access node. If the buffer is near-empty and the timeout period is about to expire, the relay node may execute the handover, so as to ensure a successful handover with minimal data loss for the end-user wireless device. These and additional operations are further described with respect to the embodiments depicted in FIGS. 1-6 below.

Figure 1:
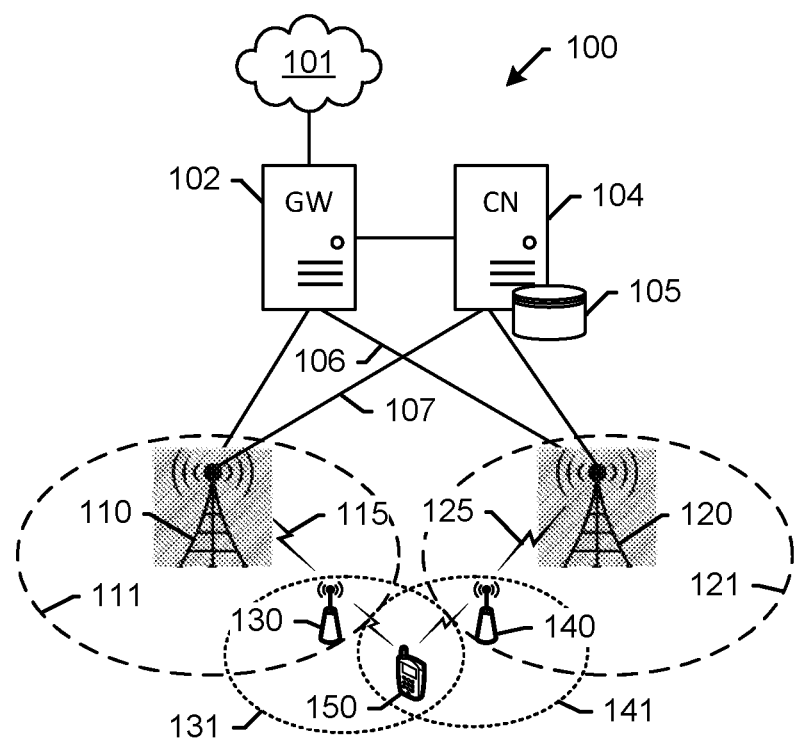
FIG. 1 depicts an exemplary system for scheduling data packets prior to handover execution.

FIG. 1 depicts an exemplary system 100 for donor selection. System 100 comprises a communication network 101, gateway 102, controller node 104, access nodes 110 and 120, relay nodes 130 and 140, and end-user wireless device 150. Access node 110 is illustrated as having coverage area 111, and access node 120 is illustrated as having coverage area 121. Relay node 130 is located within coverage area 111, and is illustrated as having its own coverage area 131. Similarly, relay node 140 is located within coverage area 121 and is illustrated as having its own coverage area 141. End-user wireless device 150 is located within outside either coverage area 111, 121, and within both coverage areas 131, 141. Consequently, relay nodes 130, 140 can relay services respectively from one of access nodes 110, 120, to end-user wireless device 150. To achieve this, relay nodes 130, 140 may each be communicatively coupled to a relay node, as further described herein. In either case, relay nodes 130, 140 act as wireless access points for wireless device 150. Thus, wireless device 150 may access network services from either of access nodes 110, 120, by virtue of being connected to one of relay nodes 130, 140.

In operation, relay node 130 may be serving end-user wireless device 150, and may determine that a handover is necessary. This determination may be made, for instance, based on a quality of wireless link 115 between access node 110 and relay node 130, i.e. a backhaul link for relay node 130. The performance of backhaul link 115 may affect the performance of a link between relay node 130 and end-user wireless device 150. Thus, either wireless device 150 or relay node 130 determines that a handover is necessary. According to this embodiment, relay node 130 transmits to end-user wireless device 150 any data packets remaining in a buffer associated with end-user wireless device 150 prior to executing the handover to relay node 140. Thus, the remaining data packets in the buffer need not be transmitted across numerous network elements to relay node 140. As described above, existing methods involve setting up tunnels to transmit the remaining buffered data through access node 110, one or more of gateway 102 or controller node 104, through access node 120, eventually to relay node 140, so that the remaining buffered data is transmitted to end-user wireless device 150 upon a complete handover to relay node 140. However, this is time and resource prohibitive, and may result in the session being broken, such that the user experience of end-user wireless device 150 is compromised. Rather, emptying the buffer at relay node 130 by transmitting the buffered data to end-user wireless device 150 prior to executing the handover thereby mitigates any risk of disrupting the communication to end-user wireless device 150.

For example, upon determining that a handover is necessary, or needs to be initiated, relay node 130 requests or otherwise receives a signal measurement of a signal between relay node 140 and wireless device 150. The measurement may be, for instance, of a reference signal broadcast or otherwise transmitted from relay node 140 and measured at end-user wireless device 150. The measurement can include a reference signal receive power (RSRP), signal-to-noise ratio (SNR), signal-to-interference noise radio (SINR), etc. End-user wireless device 150 transmits the measurement to relay node 130. The transmitted measurement can also include an identifier of relay node 140. For instance, the identifier can include a unique physical cell identifier (PCI) of relay node 140, or of a specific cell deployed by relay node 140. For instance, depending on the type of node, an access node can deploy more than one cell, each of which has a unique PCI. Therefore, relay node 130 is able to determine an identity of relay node 140 using the PCI. Based on the identifier, relay node 130 may recognize that relay node 140 is a relay access node or a destination access node to which it would take excess time to transmit remaining buffered data intended for end-user wireless device 150. For instance, relay node 130 may include a table stored on a memory thereof, the table identifying destination access nodes for which the disclosed scheduling operations are to be performed during a handover.

Consequently, relay node 130 adjusts its scheduling operations so as to transmit the remaining buffered data directly to end-user wireless device 150 prior to executing the handover. Relay node 130 can initiate the handover and transmit a handover request to relay node 140 prior to emptying the buffered data. Subsequently, relay node 130 schedules the remaining buffered data using a lowest-possible MCS. The lowest possible MCS can include, for example, quadrature phase shift keying (QPSK), which is lower than other modulation schemes used in cellular networks, such as quadrature amplitude modulation (QAM, 16QAM, 64QAM, etc.). Moreover, relay node 130 adjusts the scheduling operation so as to ignore any subsequent channel quality indicator (CQI) reports from end-user wireless device 150, since CQI reports typically alter the MCS that is used to schedule the data. Ignoring the CQI reports and using the lowest-possible MCS ensures that end-user wireless device 150 has a higher chance of receiving the data, versus using a higher MCS that can be subject to losses. When relay node 130 determines that the buffer is empty, or nearly empty, the handover is executed by, for instance, issuing a handover command to end-user wireless device 150 to request a handover from relay node 140.

In an embodiment, relay nodes 130, 140 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from donor access nodes 110, 120 are amplified and transmitted respectively by relay nodes 130, 140 to wireless device 150. Likewise, RF signals received from wireless device 150 are amplified and transmitted by relay nodes 130, 140 respectively to donor access nodes 110, 120. Alternatively or in addition, a layer 2 relay device performs a decode and forward (DF) function. RF signals received from donor access nodes 110, 120 are demodulated and decoded, then encoded and modulated again before being transmitted by relay nodes 130, 140 to wireless device 150. Likewise, RF signals received from wireless device 150 are demodulated and decoded, then encoded and modulated again before being transmitted by relay nodes 130, 140 to donor access nodes 110, 120. Alternatively or in addition, a layer 3 relay device also performs a decode and forward function. However, a layer 3 relay device also performs additional processing (such as ciphering and/or data concatenation/segmentation/resassembly) In other words, relay nodes 130, 140 perform demodulation and decoding of the received RF signals (either uplink or downlink), processes received data, then encodes, modulates, and transmits the data to wireless device 150.

Wireless device 150 may be any device, system, combination of devices, or other such communication platform capable of communicating wirelessly with relay nodes 130, 140 or access nodes 110, 120 using one or more frequency bands deployed by relay nodes 130, 140, or access nodes 110, 120. Wireless device 150 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120 or relay nodes 130, 140. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 150, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107, 108, 109 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access nodes 110, 120 and relay nodes 130, 140 can be any network node configured to provide communication between wireless device 150 and communication network 101, including standard access nodes and/or short range, low power, small access nodes. For instance, access nodes 110, 120 may include any standard access node, such as a macrocell access node, base transceiver station, a radio base station, an eNodeB device, an enhanced eNodeB device, or the like. In an exemplary embodiment, a macrocell access node can have a coverage area 111, 121 in the range of approximately five kilometers to thirty five kilometers and an output power in the tens of watts. Relay nodes 130, 140 can be a small access node including a microcell access node, a picocell access node, a femtocell access node, or the like such as a home NodeB or a home eNodeB device. Moreover, it is noted that while access nodes 110, 120, 130, 140 are illustrated in FIG. 1, any number of access nodes can be implemented within system 100.

Access nodes 110, 120, 130, 140 can comprise a processor and associated circuitry to execute or direct the execution of computer-readable instructions to obtain information. Access nodes 110, 120, 130, 140 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. See, for example, FIGS. 2-3 describing components of relay nodes 130, 140. Further, access nodes 110, 120, 130, 140 can receive instructions and other input at a user interface. Access nodes 110, 120 communicate with gateway node 102 and controller node 104 via communication links 106, 107.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101

Figure 2:
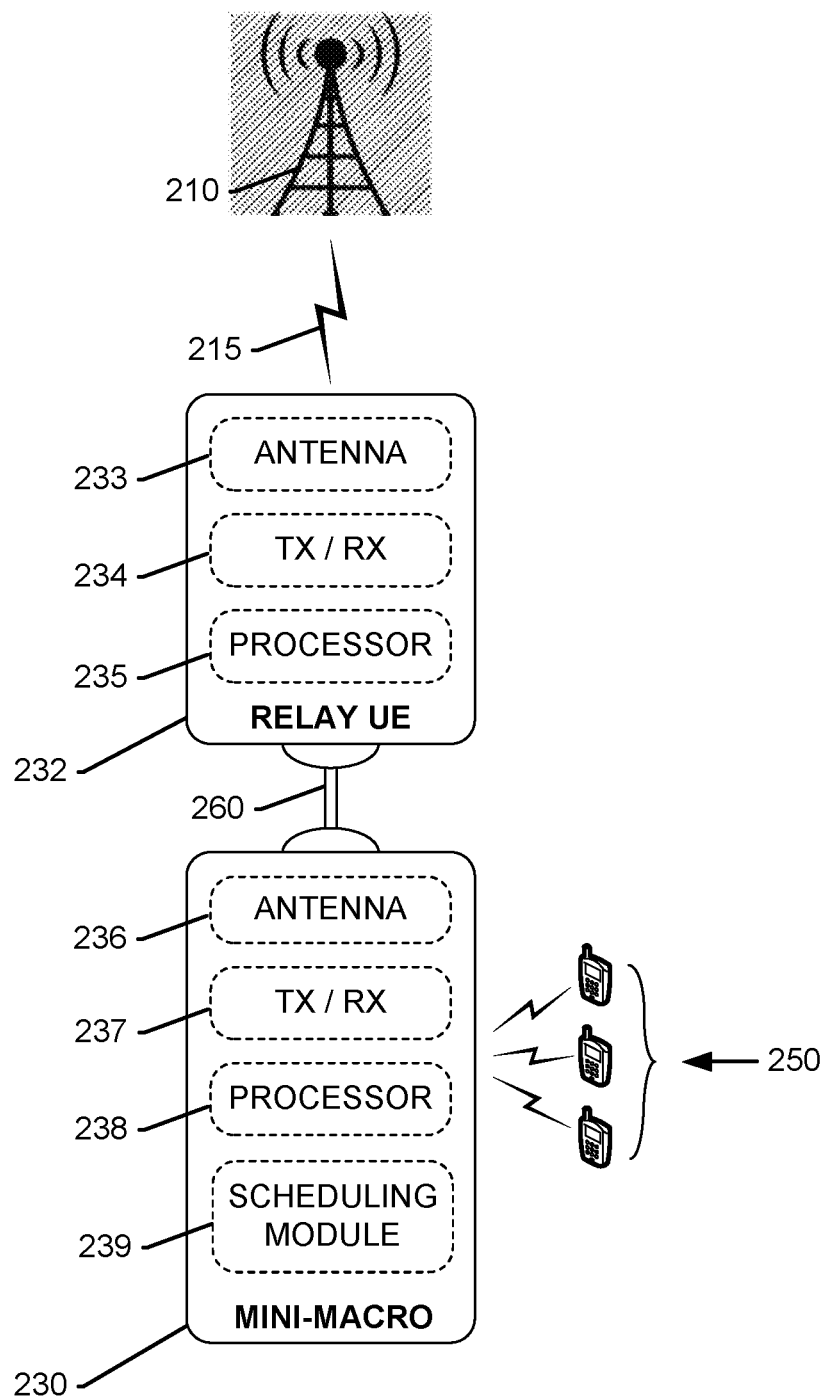
FIG. 2 depicts an exemplary relay node comprising a separate relay node and a mini-macro access node.
Figure 3:
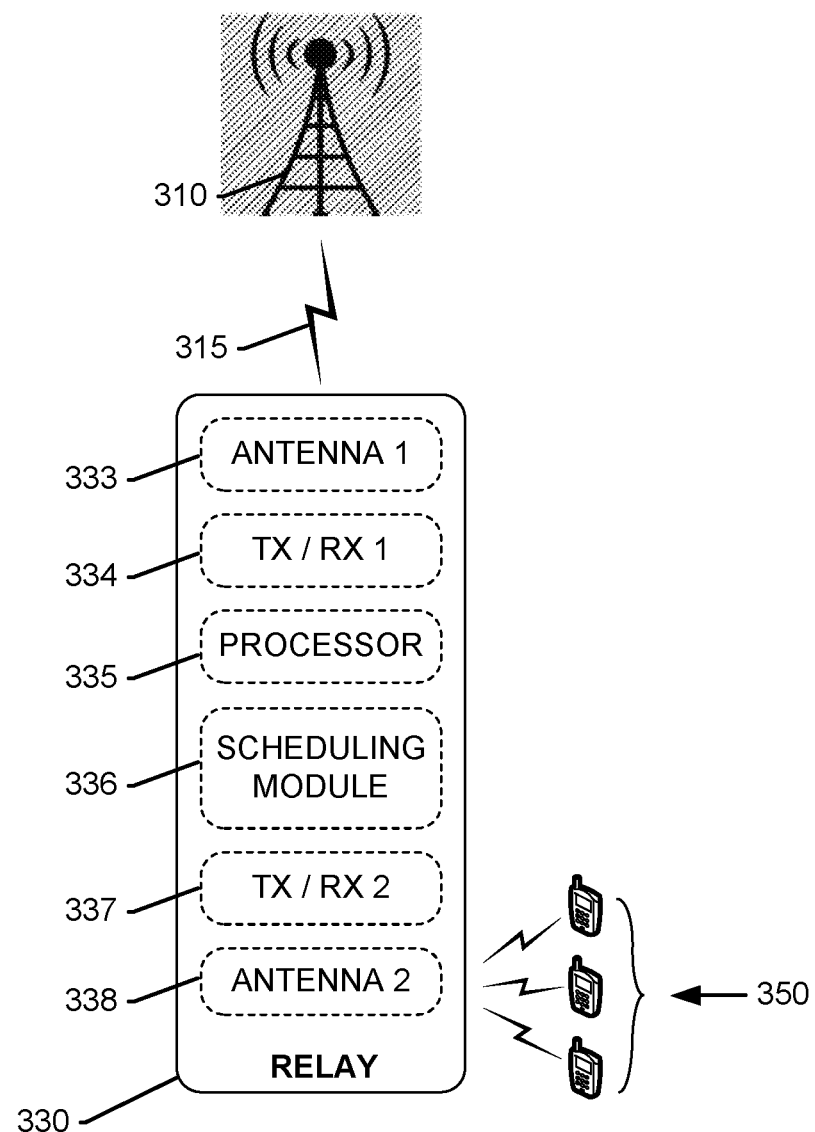
FIG. 3 depicts an exemplary relay node combining a combined relay node and a mini-macro access node.

FIGS. 2 and 3 depict alternate configurations of a relay node. For example, FIG. 2 depicts an exemplary relay node comprising a separate mini-macro access node 230 and a relay wireless device 232. Relay wireless device 232 provides a communication path between relay access node 230 and donor access node 210. Relay wireless device 232 is illustrated as comprising an antenna 233 for direct (i.e. unrelayed) communication with access node 210 via communication link 215, a transceiver 234, and a processor 235. Further, relay wireless device 232 is coupled to mini-macro base station or access node 230 via a communication interface 260. Communication interface 260 may be any interface that enables direct communication between relay wireless device 232 and mini-macro 230, such as USB, FireWire, Ethernet, or any other serial, parallel, analog, or digital interface. Mini-macro 230 is illustrated as comprising an antenna 236 for wireless communication with end wireless devices 250, a transceiver 237, a processor 238, and a scheduling module 239 for performing scheduling operations described herein (for example with reference to FIG. 5). Although only one transceiver is depicted in each of relay wireless device 232 and mini-macro 230, additional transceivers may be incorporated in order to facilitate communication across interface 260 and other network elements.

In an alternate embodiment, FIG. 3 depicts an exemplary relay node 330 comprising a combined relay node and a mini-macro access node. Relay node 330 is illustrated as comprising a first antenna 333 for direct communication with donor access node 310 via communication link 315, a first transceiver 334, a processor 335, a scheduling module 336 for enabling relay node 330 to perform scheduling operations described herein (for example with reference to FIG. 5), a second transceiver 337, and a second antenna 338 for wireless communication with end wireless devices 350. Although only two transceivers are depicted in relay access node 330, additional transceivers may be incorporated in order to facilitate communication with other network elements.

Figure 4:
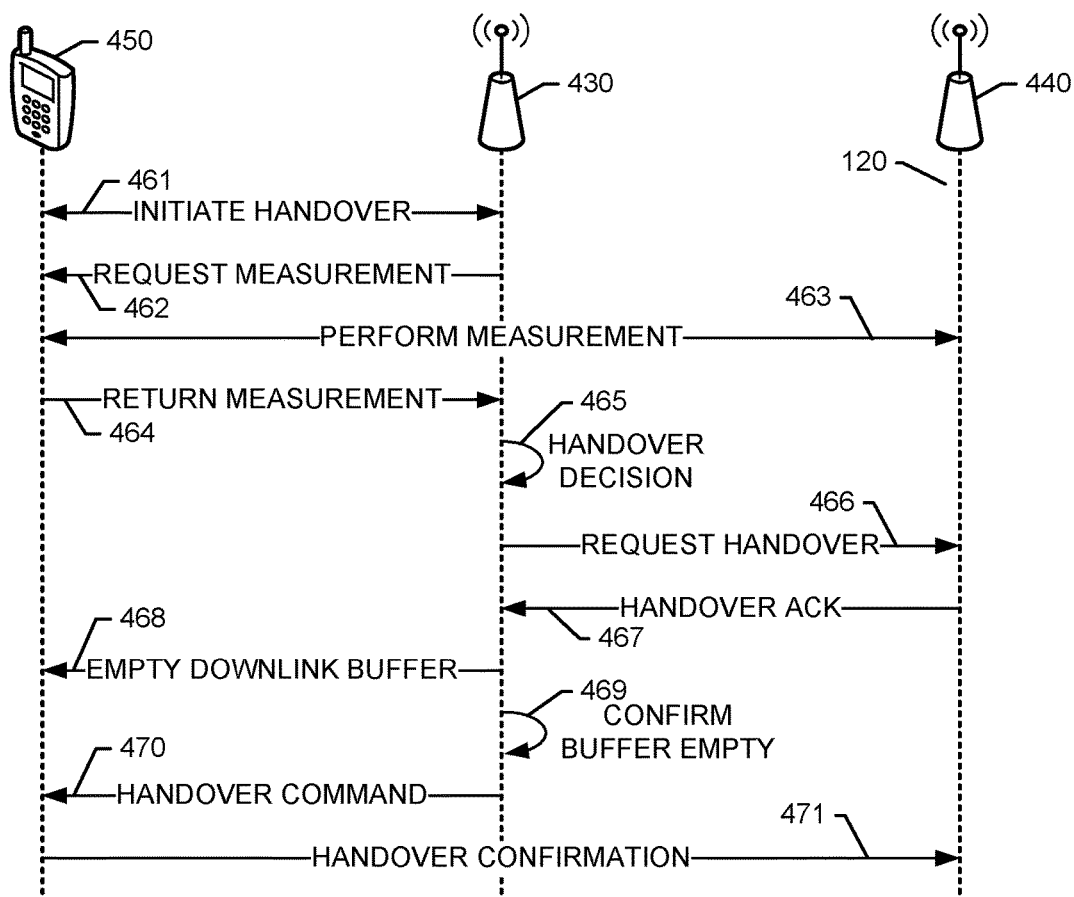
FIG. 4 depicts an exemplary network flow diagram for scheduling data packets prior to handover execution.

FIG. 4 depicts an exemplary network flow diagram for scheduling data packets prior to handover execution. The network flow is illustrated with respect to an end-user wireless device 450, a first relay node 430, and a second relay node 440. For example, first relay node 430 is configured to relay services from a donor access node (not shown) to end-user wireless device 450. Also not shown is a relay wireless device coupled to each relay node 430, 440, for enabling a connection with said donor access node. In other embodiments, the flow can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

In operation, at 461, a handover is initiated. Handover initiation 461 may be triggered by, for instance, a low quality of a wireless link between first relay node 430 and end-user wireless device 450, or a weak backhaul connection, as further described above. Thus, either end-user wireless device 450 or first relay node 430 determines that a handover is necessary. In either case, at 462, first relay node 430 instructs end-user wireless device 450 to perform measurements of signals transmitted from second relay node 440. The measurement may be, for instance, of a reference signal broadcast or otherwise transmitted from second relay node 440 and measured at end-user wireless device 450. The measurement can include a reference signal receive power (RSRP), signal-to-noise ratio (SNR), signal-to-interference noise radio (SINR), etc.

In response, at 463, end-user wireless device 450 performs the measurements and, at 464, returns the measurements to first relay node 430. The transmitted measurement can also include an identifier of second relay node 440. For instance, the identifier can include a unique physical cell identifier (PCI) of second relay node 440, or of a specific cell deployed by second relay node 440. Thus, first relay node 430 is able to determine an identity of second relay node 440 using the PCI. At 465, first relay node 430 may perform a handover decision based on the returned signal measurement and the identifier. For instance, based on the identifier, first relay node 430 may recognize that second relay node 440 is a relay access node or a destination access node to which it would take excess time to transmit remaining buffered data intended for end-user wireless device 450. The identification may be based on a table stored on a memory of first relay node 430. In some embodiments, if end-user wireless device 450 receives a low-strength signal from second relay node 440, then first relay node 430 may determine that it is a waste of resources to attempt the handover.

When handover decision 465 is positive, then in 466, first relay node 430 transmits a handover request to second relay node 440 and second relay node 440 responds with an acknowledgement in 467. Subsequently at 468, first relay node 430 adjusts its scheduling operations so as to transmit the remaining buffered data directly to end-user wireless device 450. First relay node 430 schedules the remaining buffered data using a lowest-possible MCS. The lowest possible MCS can include, for example, quadrature phase shift keying (QPSK), which is lower than other modulation schemes used in cellular networks, such as quadrature amplitude modulation (QAM, 16QAM, 64QAM, etc.). Moreover, first relay node 430 adjusts the scheduling operation so as to ignore any subsequent channel quality indicator (CQI) reports from end-user wireless device 450. Ignoring the CQI reports and using the lowest-possible MCS ensures that end-user wireless device 450 has a higher chance of receiving the data, versus using a higher MCS that can be subject to losses.

At 469, when first relay node 430 determines that the buffer is empty, or nearly empty, the handover is executed. For instance, at 470, first relay node 430 transmits handover parameters in a handover command to end-user wireless device 450, and end-user wireless device 450 confirms the handover with second relay node 440 in 471.

Figure 5:
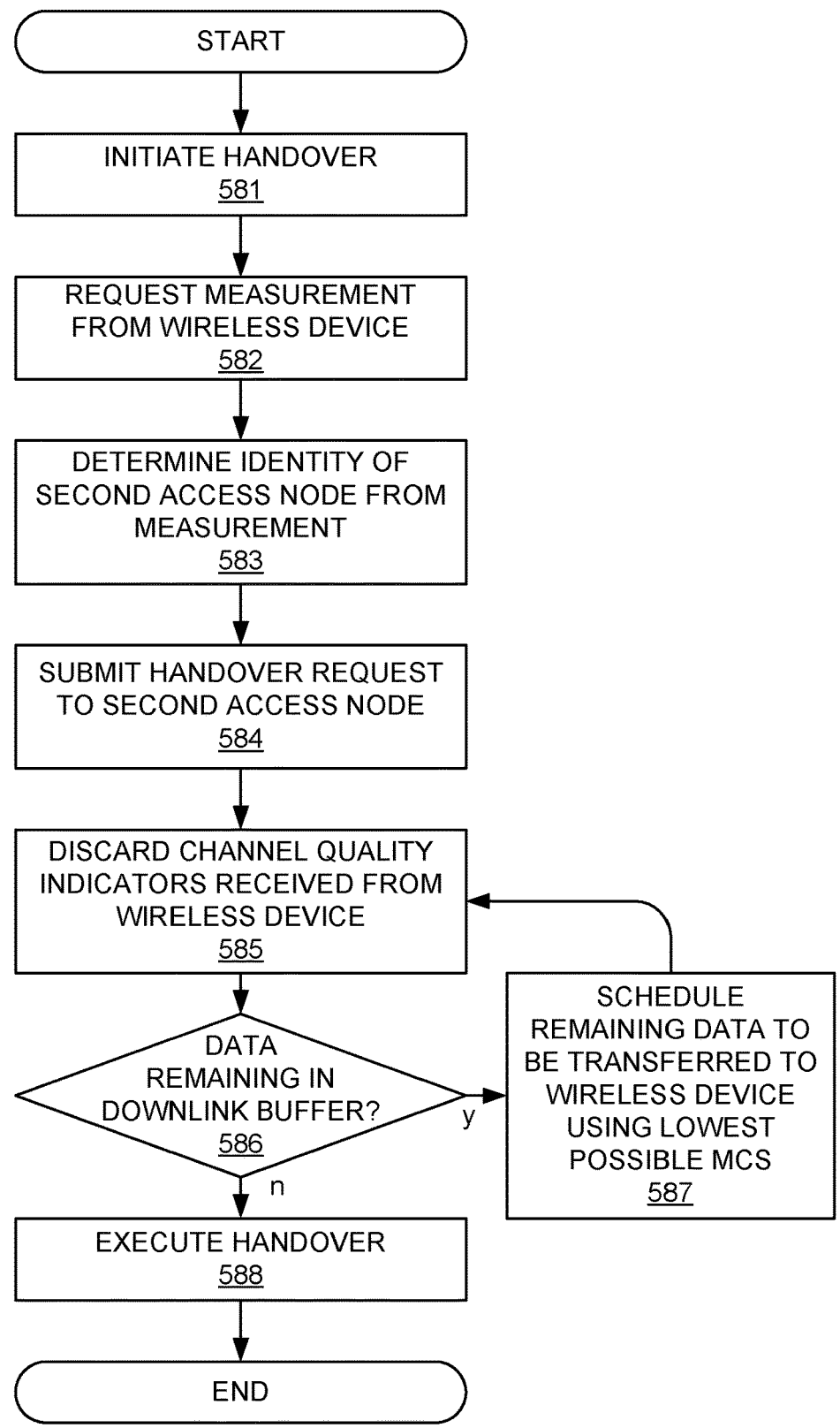
FIG. 5 depicts an exemplary method for scheduling data packets prior to handover execution.

FIG. 5 depicts an exemplary method for scheduling data packets prior to handover execution. The method is generally discussed with reference to elements within system 100. For example, the method comprises operations that may be performed by relay node 130. In other embodiments, the method can be implemented with any suitable network element. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

In operation, at 581, a handover is initiated. Handover initiation 581 may be triggered by, for instance, a low quality of a wireless link between a relay node and an end-user wireless device, or a weak backhaul connection, as further described above. At 582, a request is transmitted to the end-user wireless device to perform measurements of signals transmitted from a second nearby second access node. The measurement may be, for instance, of a reference signal broadcast or otherwise transmitted from the second access node and measured at the end-user wireless device. The measurement can include a reference signal receive power (RSRP), signal-to-noise ratio (SNR), signal-to-interference noise radio (SINR), etc. In response, the end-user wireless device performs the measurements and returns the measurements to the relay node.

At 583, an identity of the second access node is determined. The determination may be performed, for instance, based on an identifier of second access node included in the measurement from the end-user wireless device. For instance, the identifier can include a unique physical cell identifier (PCI) of the second access node. Thus, the relay node is able to determine an identity of the second access node using the PCI. This information is used to make a handover decision. For instance, based on the identifier, the relay node may recognize that the second access node is a relay access node, or a destination access node to which it would take excess time to transmit remaining buffered data intended for the end-user wireless device. The identity may be compared with one or more criteria to determine whether or not it would take excess time to transmit the remaining buffered data to the second access node. For instance, the method may be performed at a macro access node such as access node 110 with the criteria being that the second or destination access node is a mini-macro access node such as relay access node 140. Alternatively, the method may be performed at a mini-macro access node with the criteria being that the destination access node is a macro access node, wherein it takes extra latency, i.e. time, for any additional information transfer and signaling. Other types of criteria may be defined by those having ordinary skill in the art in light of this disclosure and based on an amount of time or latency required to transmit the buffered data. A threshold time or latency may be used to trigger operations 585-587 described below.

At 584, the relay node then transmits a handover request to the second access node. Subsequently, in 585, the relay node adjusts its scheduling operations so as to discard CQI indicators that are otherwise regularly transmitted from the end-user wireless device and used in scheduling operations at the relay node. The CQI indicators are ignored because the relay node also schedules any remaining buffered data to be transmitted to the end-user wireless device using a lowest-possible MCS in step 587. However, this scheduling is necessary contingent upon a determination that said buffered data actually exists. Thus, in 586, the buffer of data intended to be transmitted to the end-user wireless device is monitored. The buffer may be, for instance, a downlink buffer. If there exist data packets in the buffer, then at 587, the data is transmitted directly to the end-user wireless device using the lowest possible MCS, which may be quadrature phase shift keying (QPSK). Table 1 below depicts different modulations (MCS) corresponding to each CQI indicator. In this case, the lowest possible MCS corresponds to a CQI of 1. Since step 585, CQI indicators transmitted from the wireless device are ignored, as otherwise they trigger higher modulation coding schemes that, despite being more efficient, may result in data loss of the remaining data. Although an exemplary mapping of CQI-to-MCS is depicted in Table 1, other mapping systems may be used to achieve the same effect.

TABLE 1

| CQI | Modulation | Coding Rate x1024 | Efficiency |
| --- | --- | --- | --- |
| 0 | | out of range | |
| 1 | QPSK | 78 | 0.1523 |
| 2 | QPSK | 193 | 0.377 |
| 3 | QPSK | 449 | 0.877 |
| 4 | 16 QAM | 378 | 1.4766 |
| 5 | 16 QAM | 490 | 1.9141 |
| 6 | 16 QAM | 616 | 2.4063 |
| 7 | 64 QAM | 466 | 2.7305 |
| 8 | 64 QAM | 567 | 3.3223 |
| 9 | 64 QAM | 666 | 3.9023 |

The loop of discarding or ignoring the CQI reports in 585, monitoring the buffer in 586, and using the lowest-possible MCS in 587 ensures that end-user wireless device 450 receives as much data as possible prior to its handover. Eventually, if the relay node determines that the buffer is empty, or nearly empty, the handover is executed in 588. The determination of a nearly-empty buffer may be based on a percent of buffer size that contains remaining data. For instance, if the buffer is less than 10% or 5% full, then the handover may be executed. Alternatively or in addition, if the buffer is near-empty and a timeout period for handover execution is about to expire, the relay node may execute the handover, so as to ensure a successful handover with minimal data loss for the end-user wireless device.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: relay nodes 130, 140, access nodes 110, 120, wireless device 150, and/or network 101.

Figure 6:
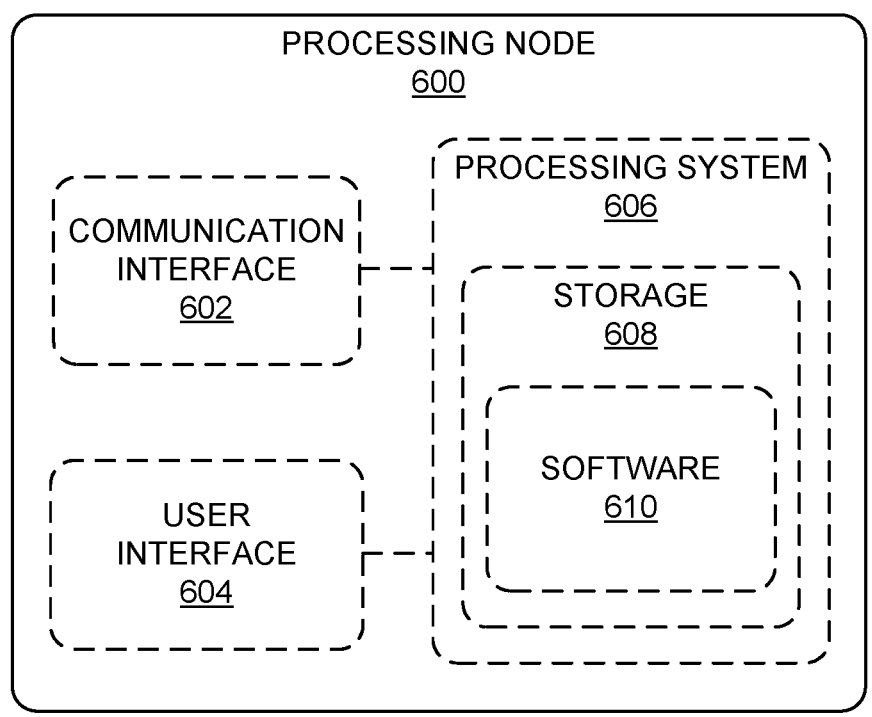
FIG. 6 depicts an exemplary processing node.

FIG. 6 depicts an exemplary processing node 600 comprising communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. For example, storage 608 may include a buffer. Software 610 may include computer programs, firmware, or some other form of machine-readable instructions, including an operating system, utilities, drivers, network interfaces, applications, or some other type of software. For example, software 610 may include a scheduling module. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing handovers, the method comprising:
   initiating a handover of a wireless device from a first access node to a second access node;
   upon determining that the second access node comprises a relay access node, transmitting any existing data in a downlink buffer associated with the wireless device to the wireless device prior to executing the handover; and
   upon determining that the downlink buffer is substantially empty, executing the handover.

2. The method of claim 1, wherein determining that the second access node comprises a relay access node further comprises determining an identity of the second access node.

3. The method of claim 2, wherein determining the identity of the second access node is based on a signal measurement of the second access node measured at and received from the wireless device.

4. The method of claim 3, wherein determining the identity of the second access node comprises retrieving a physical cell identifier of the second access node from the signal measurement received from the wireless device.

5. The method of claim 1, wherein initiating the handover comprises transmitting a handover request to the second access node.

6. The method of claim 1, further comprising ignoring a channel quality indicator (CQI) from the wireless device subsequent to initiating the handover.

7. The method of claim 1, wherein transmitting said any data comprises scheduling said any data for transmission to the wireless device using a lowest possible modulation coding scheme (MCS).

8. The method of claim 7, wherein the lowest possible MCS comprises quadrature phase shift keying (QPSK).

9. The method of claim 7, further comprising ceasing transmitting said any data upon determining that the downlink buffer is substantially empty.

10. A system for performing handovers, the system comprising:
    a first access node for providing network services to a wireless device; and
    a processor communicatively coupled to the first access node, the processor for configuring the first access node to execute operations comprising:
    receiving a signal measurement of a second access node from the wireless device;
    determining that a handover of the wireless device is required from the first access node to the second access node; and
    upon determining that the second access node comprises a relay access node, transmitting to the wireless device a substantial portion of data packets in a buffer associated with the wireless device prior to executing the handover.

11. The system of claim 10, wherein the operations further comprise initiating the handover of the wireless device upon determining that the handover is required.

12. The system of claim 11, wherein initiating the handover comprises transmitting a handover request to the second access node.

13. The system of claim 10, wherein the step of transmitting said substantial portion of data packets is performed until the buffer is substantially empty.

14. The system of claim 13, wherein the step of transmitting said substantial portion of data packets is performed using a lowest possible modulation coding scheme (MCS).

15. The system of claim 13, wherein the operations further comprise executing the handover subsequent to transmitting said substantial portion of data packets.

16. A processing node for performing handovers, the processing node comprising a processor for enabling the processing node to perform operations comprising:
    receiving an identity of an access node from a wireless device;
    determining that a handover of the wireless device is required to the access node;
    transmitting a handover request to the access node;

upon determining that the identity of the access node corresponds to a mini-macro access node, transmitting to the wireless device any existing data from a buffer associated with the wireless device until the buffer is substantially empty; and upon determining that the buffer is substantially empty, executing the handover of the wireless device to the access node.

17. The processing node of claim 16, wherein transmitting said any data comprises scheduling said any data for transmission to the wireless device using a lowest possible modulation coding scheme (MCS).

18. The processing node of claim 17, wherein the lowest possible MCS comprises quadrature phase shift keying (QPSK).

* * * * *